Oct. 4, 1932.  A. M. BUSWELL ET AL  1,880,773
CELLULOSE DIGESTION
Filed Aug. 15, 1929
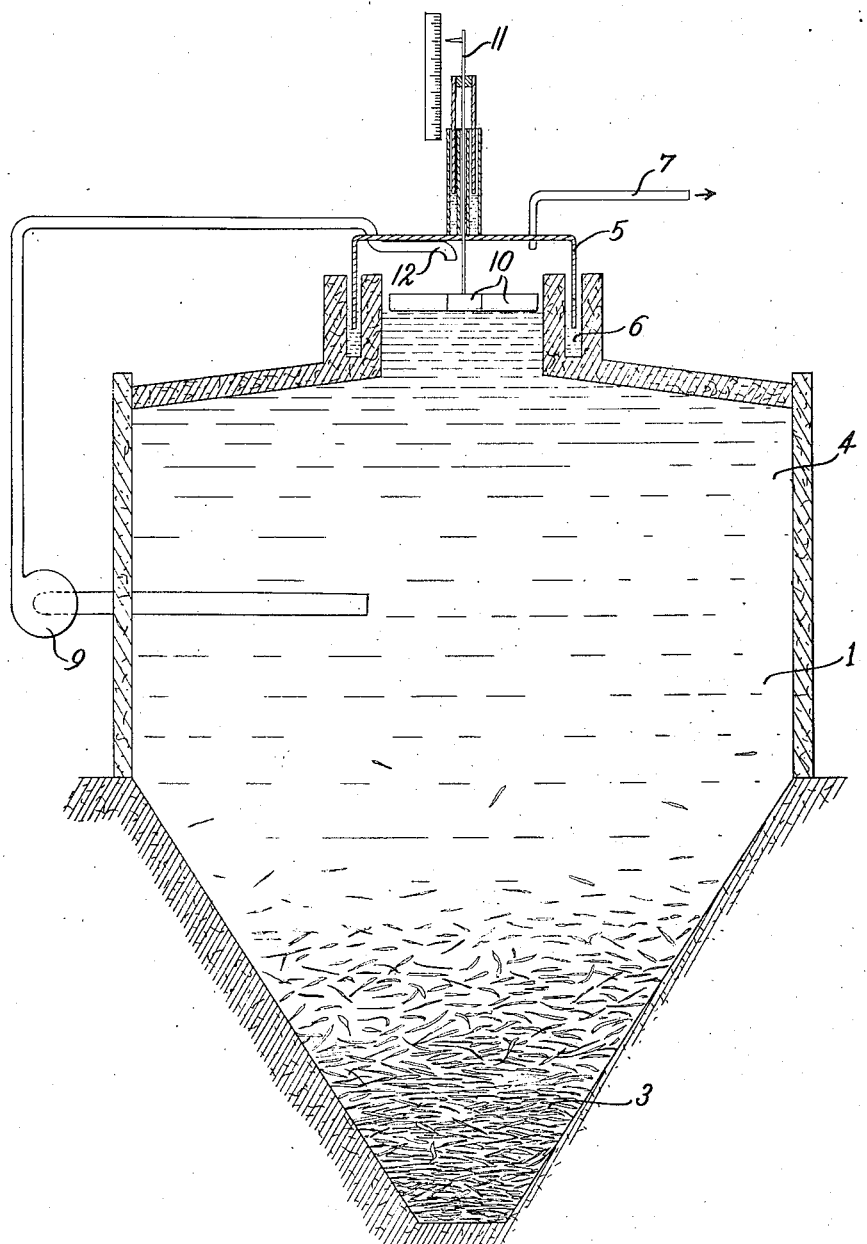
Inventors
Arthur M. Buswell
Clair S. Boruff
By Brown Jackson Boucher & Dienner Attys Patented Oct. 4, 1932

1,880,773

UNITED STATES PATENT OFFICE

ARTHUR M. BUSWELL, OF URBANA, AND CLAIR S. BORUFF, OF MONMOUTH, ILLINOIS, ASSIGNORS TO BOARD OF TRUSTEES OF THE UNIVERSITY OF ILLINOIS, OF URBANA, ILLINOIS, A CORPORATION OF ILLINOIS

CELLULOSE DIGESTION

Application filed August 15, 1929. Serial No. 386,080.

This invention relates to the treatment of cellulose containing material by bacteriological action.

It is one of the objects of the present invention to produce combustible gas by the action of bacteria upon cellulose containing material. Where necessary the material may be pre-treated to facilitate the bacteriological action.

We have found that corn stalks when properly treated constitute suitable material for bacteriological action resulting in the formation of methane gas. The treatment may consist of soaking or cooking for about one hour, preferably in the presence of a dilute acid or alkali. The bacteria used are the anaerobes found in sewage sludge, although these bacteria may, of course, be obtained from other sources and it is within the purview of the present invention to provide cultures of the proper bacteria for use in connection with this process. We have found that the corn stalks, when such are used, are not entirely consumed by the bacteriological action. It appears that the inner pith structure of the stalks is consumed while the fibre-like structure that constitutes the outer portion of the stalk may or may not remain depending upon the extent to which the decomposition is permitted to take place. This remaining material may be a valuable product for various purposes, such as the manufacture of paper for instance, and it is one of the objects of the present invention to provide a method of subjecting corn stalks to bacteriological action to render them more suitable for commercial purposes.

Before proceeding with a further explanation of the present invention it may be well to describe an experiment which we have performed in connection with the same.

Three bottles of about two quart capacity were provided with proper stoppers and connections to hold fermenting organic material and collect any gases which might be produced. Without going into details it may be said that a set of these bottles was arranged to duplicate on a small scale the sludge digestion tank shown in the copending application of Arthur M. Buswell, Serial No. 361,602, filed May 9, 1929. This tank is shown in the accompanying drawing to which reference will be had more particularly as the description proceeds. 150 cubic centimeters of sewage sludge was added to each of these three bottles. There were two objects in using this sewage sludge; first, to provide the proper bacteria for the inoculation of organic matter to be decomposed, and second to provide nitrogenous substances which are necessary for all bacterial life. We next added the following materials to the three bottles. To bottle No. 1 we added 10 grams of shredded corn stalks; to bottle No. 2 we added 10 grams of shredded corn stalks which had been cooked with water for one hour; to bottle No. 3 we added 10 grams of shredded corn stalks which had been cooked one hour with 2% sulphuric acid after which the acid was neutralized. All three bottles were filled with water and the stoppers and connections arranged to prevent the entrance of air and to allow the collection of any gases produced. Bottle No. 1 produced 1100 cubic centimeters of gas, bottle No. 2 produced 1600 cubic centimeters of gas, and bottle No. 3 produced 1900 cubic centimeters of gas.

This gas was combustible and an analysis showed 54% methane.

We have found that the corn stalks lose from 25% to 50% of their weight during the bacteriological decomposition and that about 90% of this loss in weight appears as gas. As previously stated this gas runs about 54% methane.

Corn stalks consist of, among other things, fibres of cellulose material. The fibres adjacent the edge of the stalks are tougher and more compact than those further within the stalks, the inner portion containing a pith-like cellulose material. We have found that the product remaining after the bacteriological action has taken place consists mainly of the tough fibres. It is known that in the manufacture of paper from corn stalks these outer fibres are the ones utilized. It would thus appear that the present method is suitable as a method for reducing corn stalks to a condition rendering them suitable for use in the manufacture of paper, or for any other purpose where the tough fibres of the stalk are desired, and this entirely independent of the production of the methane gas.

The bacteria used, as has been stated above, are those found in sewage sludge. In our experimental work we obtain the desired bacteria by adding sewage sludge in a certain stage of decomposition to the shredded corn stalks to be acted upon.

It is of course well known that the sewage sludge contains many different kinds of bacteria and we do not wish to limit this invention to bacteriological decomposition by the use of anaerobic bacteria, it being within the purview of the present invention to use aerobic bacteria.

The attainment of the above and further objects of the present invention will be apparent from this specification taken in conjunction with the accompanying drawing forming a part thereof.

The single figure of drawing is a diagrammatic section of a digestion tank wherein the bacteriological decomposition may take place.

Referring now more particularly to the drawing we have shown an apparatus for carrying out our improved method. The apparatus herein shown is identical to that shown in the pending application of Arthur M. Buswell, Serial No. 361,602, filed May 9, 1929, although it is of course understood that our improved method may be carried on by specifically different apparatus and the particular apparatus herein shown for carrying out our invention is not a part of the present invention. Shredded corn stalks and bacteria-containing material are introduced into the digestion tank 1 in any preferred manner.

The bacteria-containing material may consist of sewage sludge. Where sewage sludge is used we prefer to take the sewage sludge when it is in a state of decomposition corresponding to that of the sludge in the tank 5 of the pending application of Arthur M. Buswell and Sidney L. Neave, Serial No. 361,570, filed May 9, 1929, when the sludge is in a condition to leave the tank 5 and go into the tank 9 shown in that application, that is, after the sludge has undergone the primary stage of digestion, which is commonly known as the acid or foul stage of digestion. Prior to the introduction of the shredded corn stalks into the tank 1 these stalks are soaked or cooked, preferably in the presence of a chemical softener so that the corn stalks may be more readily attacked by the bacteria. The soaking or cooking may take place for about one hour and if a chemical softener is used it may consist of either an acid or an alkali. A dilute lime water solution is preferable and the bacteria may be either cooked or merely soaked in the solution. If a stronger alkali is used it is necessary to neutralize the excess alkali with some acid before the stalks are introduced into the tank 1. As a chemical softener we may use a 2% solution of sulphuric acid, neutralizing the acid with an alkali before introducing the corn stalks into the tank 1. The shredding of the corn stalks is made rather fine. The tank 1 is filled with water and sealed against the entrance of air, the corn stalks being then subjected to the action of the anaerobic bacteria in the sewage sludge.

In the tank the solid matter gradually settles to the bottom as indicated at 3, the material at 4 being mostly water. The material is permitted to remain in the tank where it undergoes bacteriological decomposition resulting in the liberation of methane gas. The top of the tank is provided with a cover 5 suitably sealed as at 6 against the entry of air into the tank. A pipe 7 extends from the cover 5 to a gas holder. To prevent the accumulation of scum or foam at the top of the liquid we provide a circulator in the form of a pump 9 which withdraws liquid from a level below that to which the scum or foam may extend and deposits it at the top of the foam or scum. If desired, we may provide a device for distributing the returned liquid over the surface of the top of the tank. In the embodiment herein illustrated this distribution is accomplished by allowing the returned liquid to fall upon two boards 10, nailed together in the form of a cross and floating on top of the liquid. This float is provided with a rod 11 extending outside of the tank cover 5 which rod serves as an indicator of the level of the liquid in the tank. The discharge pipe 12 is placed within a very short distance, two or three inches, from the member 10 thereby further avoiding violent jet or spray action.

The decomposed corn stalks tend to settle to the bottom of the tank and may be withdrawn when fully decomposed.

In the manufacture of paper from corn stalks it is necessary, as a step in the process, to shred the corn stalks and remove the soft pith-like structure, leaving only the tough fibres for use in the making of the paper. The same applies to the manufacture of paper from bagasse. Edwin Sutermeister in his book entitled "The Chemistry of Pulp in Paper Making", (published by John Wiley and Sons, 1929) makes the following statement with reference to the use of bagasse or corn stalks in the manufacture of paper:

"*Bagasse and corn stalks*.—These two materials are so similar . . . that they may be considered as practically identical. The pulp from both raw materials . . . include serrated cells . . . and many pith cells which are so thin-walled that nearly all become flattened during the reduction process. These pith cells are much larger than those from straw and are, therefore, much more difficult to remove by washing. They impart to the paper made from this fiber a hardness and rattle which are undesirable in many products, and as their separation from the rest of the fiber has proved very difficult the presence of pith has proved one of the chief stumbling blocks in the way of using either bagasse or corn stalks."

We have found that if the bacteriological decomposition is permitted to take place only to a certain predetermined extent practically all of the pith-like structure will be decomposed, going off mostly as gases, the tough fibres alone remaining.

These fibres may then be removed and used for any purpose desired, such for instance as paper making. This invention may therefore be looked upon as either a process for treating cellulose containing material to produce methane gas or as a method of treating cellulose containing material such as corn stalks, bagasse or the like for separating the tough fibres from the rest of the structure.

In compliance with the requirements of the patent statutes we have herein shown and described a preferred embodiment of our invention. It is however to be understood that the invention is not limited to the precise details herein shown, the same being merely illustrative of the invention.

What we consider new and desire to secure by Letters Patent is:

1. The method of producing methane which comprises cooking cellulose containing material to render it readily susceptible to bacteriological action, then subjecting the cooked material to the action of anaerobic bacteria in the absence of oxygen, and collecting the gas produced said bacteria being such as may be obtained from sewage sludge which is in an active state of fermentation.

2. The method of producing methane which comprises cooking cellulose containing material in the presence of a chemical softener to render it readily susceptible to bacteriological action, then subjecting the cooked material to the action of anaerobic bacteria in the absence of oxygen, and collecting the gases produced said bacteria being such as may be obtained from sewage sludge which is in an active state of fermentation.

3. The method of producing methane which comprises cooking cellulose containing material in the presence of a dilute alkali to render it readily susceptible to bacteriological action, then subjecting the cooked material to the action of anaerobic bacteria in the absence of oxygen, and collecting the gases produced said bacteria being such as may be obtained from sewage sludge which is in an active state of fermentation.

4. The method of producing a methane which comprises cooking cellulose containing material in the presence of a dilute acid to render it readily susceptible to bacteriological action, then subjecting the cooked material to the action of anaerobic bacteria in the absence of oxygen, and collecting the gases produced said bacteria being such as may be obtained from sewage sludge which is in an active state of fermentation.

5. The method of producing methane which comprises cooking cellulose containing material in the presence of a chemical softener and neutralizing the remaining softener to render it readily susceptible to bacteriological action, then subjecting the cooked material to the action of anaerobic bacteria in the absence of oxygen, and collecting the gases produced said bacteria being such as may be obtained from sewage sludge which is in an active state of fermentation.

6. The method of producing methane which comprises cooking cellulose containing material in the presence of an alkali and then neutralizing the remaining alkali to render it readily susceptible to bacteriological action, then subjecting the cooked material to the action of anaerobic bacteria in the absence of oxygen, and collecting the gases produced said bacteria being such as may be obtained from sewage sludge which is in an active state of fermentation.

7. The method of producing methane which comprises cooking cellulose containing material in the presence of an acid, and then neutralizing the remaining acid to render it readily susceptible to bacteriological action, then subjecting the cooked material to the action of anaerobic bacteria in the absence of oxygen, and collecting the gases produced said bacteria being such as may be obtained from sewage sludge which is in an active state of fermentation.

8. The method of producing methane which comprises cooking shredded corn stalks in the presence of a chemical softener to render them readily susceptible to bacteriological action, then subjecting the cooked material to the action of anaerobic bacteria in the absence of oxygen, and collecting the gases produced said bacteria being such as may be obtained from sewage sludge which is in an active state of fermentation.

9. The method of producing methane which comprises cooking shredded corn stalks in the presence of an alkali and then neutralizing the remaining alkali to render them readily susceptible to bacteriological action, then subjecting the cooked material to the action of anaerobic bacteria in the absence of oxygen, and collecting the gases produced said bacteria being such as may be obtained from sewage sludge which is in an active state of fermentation.

10. The method of treating corn stalks which comprises, cooking the corn stalks in the presence of a dilute acid to render them readily susceptible to bacteriological action, then subjecting the cooked material to the action of anaerobic bacteria in the absence of oxygen, then washing the remaining fibrous material said bacteria being such as may be obtained from sewage sludge which is in an active state of fermentation.

11. The method of treating corn stalks which comprises, cooking the corn stalks in the presence of an alkali and then neutralizing the remaining alkali to render them readily susceptible to bacteriological action, then subjecting the cooked material to the action of anaerobic bacteria in the absence of oxygen, then washing the remaining fibrous material said bacteria being such as may be obtained from sewage sludge which is in an active state of fermentation.

12. The method of producing methane which comprises soaking corn stalks in a dilute acid, then subjecting the soaked material to the action of anaerobic bacteria in the absence of oxygen said bacteria being such as may be obtained from sewage sludge which is in an active state of fermentation.

In witness whereof, we hereunto subscribe our names this 3rd day of Aug. 1929.

ARTHUR M. BUSWELL.
CLAIR S. BORUFF.